(12) United States Patent
Pflüger et al.

(10) Patent No.: US 11,156,487 B2
(45) Date of Patent: Oct. 26, 2021

(54) MEASURING ASSEMBLY FOR THE ANALYSIS OF A FLOWING MEDIUM BY MEANS OF MICROWAVES

(71) Applicant: Endress+Hauser Flowtec AG, Reinach (CH)

(72) Inventors: Stefan Pflüger, Munich (DE); Steffen Ziegler, Schopfheim (DE); Frank Voigt, Weil am Rhein (DE)

(73) Assignee: Endress+Hauser Flowtec AG, Reinach (CH)

( * ) Notice: Subject to any disclaimer, the term of this patent is extended or adjusted under 35 U.S.C. 154(b) by 194 days.

(21) Appl. No.: 16/474,997

(22) PCT Filed: Nov. 22, 2017

(86) PCT No.: PCT/EP2017/080087
§ 371 (c)(1),
(2) Date: Jun. 28, 2019

(87) PCT Pub. No.: WO2018/121927
PCT Pub. Date: Jul. 5, 2018

(65) Prior Publication Data
US 2020/0191625 A1 Jun. 18, 2020

(30) Foreign Application Priority Data
Dec. 28, 2016 (DE) ...................... 10 2016 125 809.1

(51) Int. Cl.
*G01F 1/66* (2006.01)
*G01F 1/58* (2006.01)
*G01N 22/00* (2006.01)

(52) U.S. Cl.
CPC ............... *G01F 1/662* (2013.01); *G01F 1/58* (2013.01); *G01N 22/00* (2013.01)

(58) Field of Classification Search
CPC . G01F 1/58; G01F 1/586; G01F 1/588; G01F 1/662; G01N 22/00
See application file for complete search history.

(56) References Cited

U.S. PATENT DOCUMENTS 3,999,443 A 12/1976 Appel et al.
4,755,743 A 7/1988 Jakkula
(Continued)

FOREIGN PATENT DOCUMENTS

CN 100480640 C 4/2009
CN 101405614 A 4/2009
(Continued)

*Primary Examiner* — Benjamin R Schmitt
(74) *Attorney, Agent, or Firm* — Mark A. Logan; Endress+Hauser (USA) Holding Inc.

(57) ABSTRACT

The present disclosure relates to a measuring assembly comprising: a metallic measuring tube open on both sides for carrying a medium, wherein the measuring tube has an outer circumferential surface, an inner circumferential surface, and at least two apertures, wherein the two apertures extend from the outer circumferential surface to the inner circumferential surface; a dielectric cladding layer, which rests on the inner circumferential surface of the measuring tube; a first microwave antenna, which is arranged in the measuring tube and with which contact can be made through the first aperture; a second microwave antenna which is arranged in the measuring tube and with which contact can be made through the second aperture; wherein the dielectric cladding layer forms a dielectric waveguide, via which microwaves can, at least to some extent, reach from the first microwave antenna to the second microwave antenna.

13 Claims, 5 Drawing Sheets

(56) References Cited

U.S. PATENT DOCUMENTS

| | | | | |
|---|---|---|---|---|
| 6,359,444 B1* | 3/2002 | Grimes | ............ | G01N 22/00 |
| | | | | 324/633 |
| 2008/0087099 A1* | 4/2008 | Allenberg | ......... | G01F 1/7088 |
| | | | | 73/861.08 |
| 2010/0145636 A1* | 6/2010 | Nyfors | ............ | G01F 1/712 |
| | | | | 702/49 |
| 2016/0131601 A1 | 5/2016 | Sharma et al. | | |
| 2016/0146743 A1* | 5/2016 | Edward | ............ | G01F 1/582 |
| | | | | 73/61.45 |
| 2016/0313259 A1 | 10/2016 | Shayovitz | | |

FOREIGN PATENT DOCUMENTS

| | | |
|---|---|---|
| CN | 101287967 B | 8/2011 |
| DE | 3038725 A1 | 5/1982 |
| DE | 3412704 A1 | 10/1984 |
| DE | 1426280 A1 | 2/1996 |
| DE | 10164107 C1 | 9/2003 |
| DE | 102004057087 B3 | 1/2006 |
| DE | 102006034884 A1 | 4/2007 |
| WO | 91/05243 A1 | 4/1991 |
| WO | 0043759 A1 | 7/2000 |
| WO | 2013181173 A1 | 12/2013 |
| WO | 2015165554 A1 | 11/2015 |

\* cited by examiner

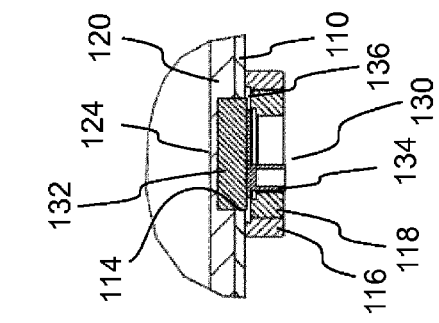
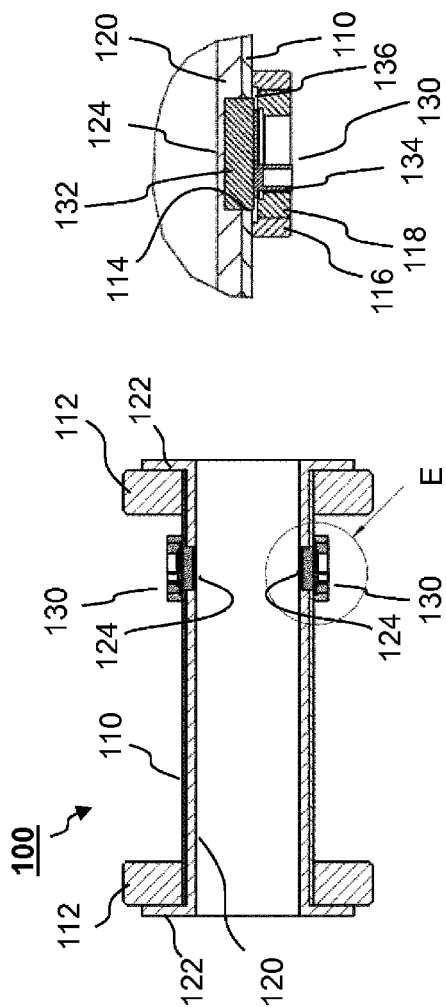
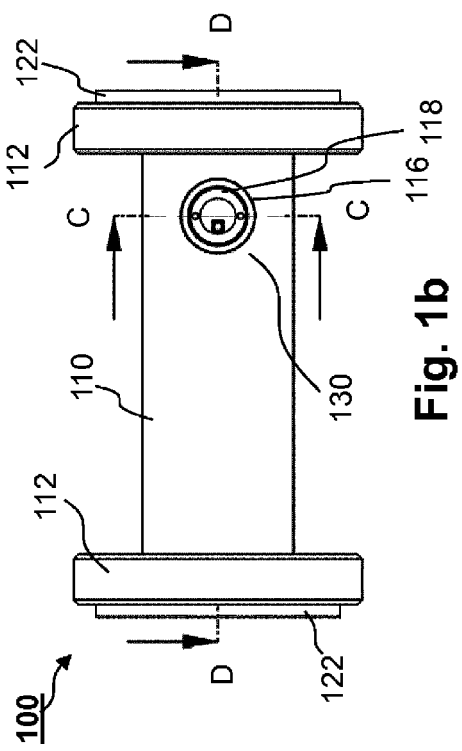
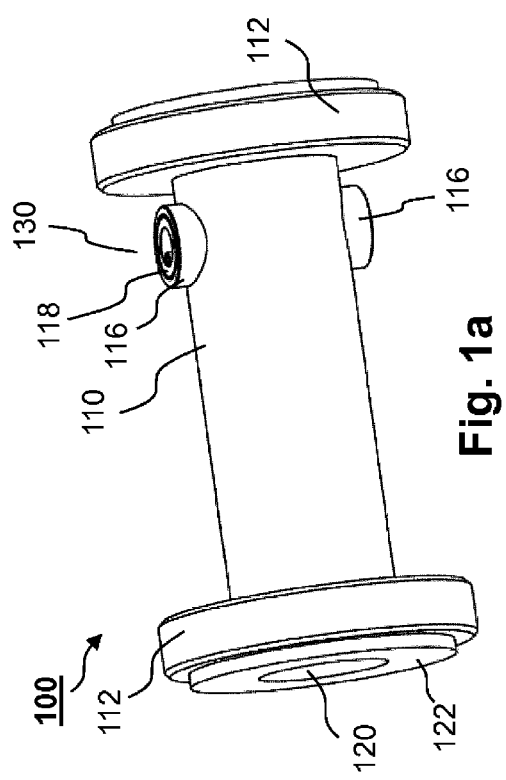
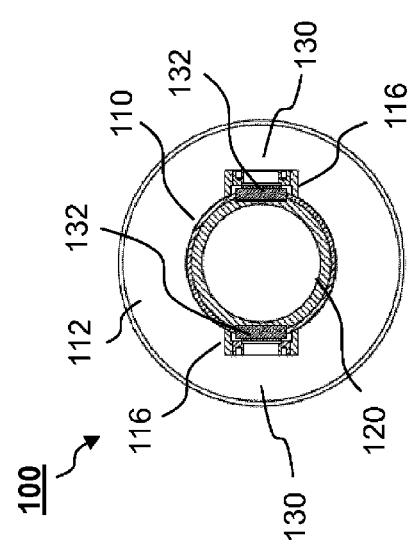

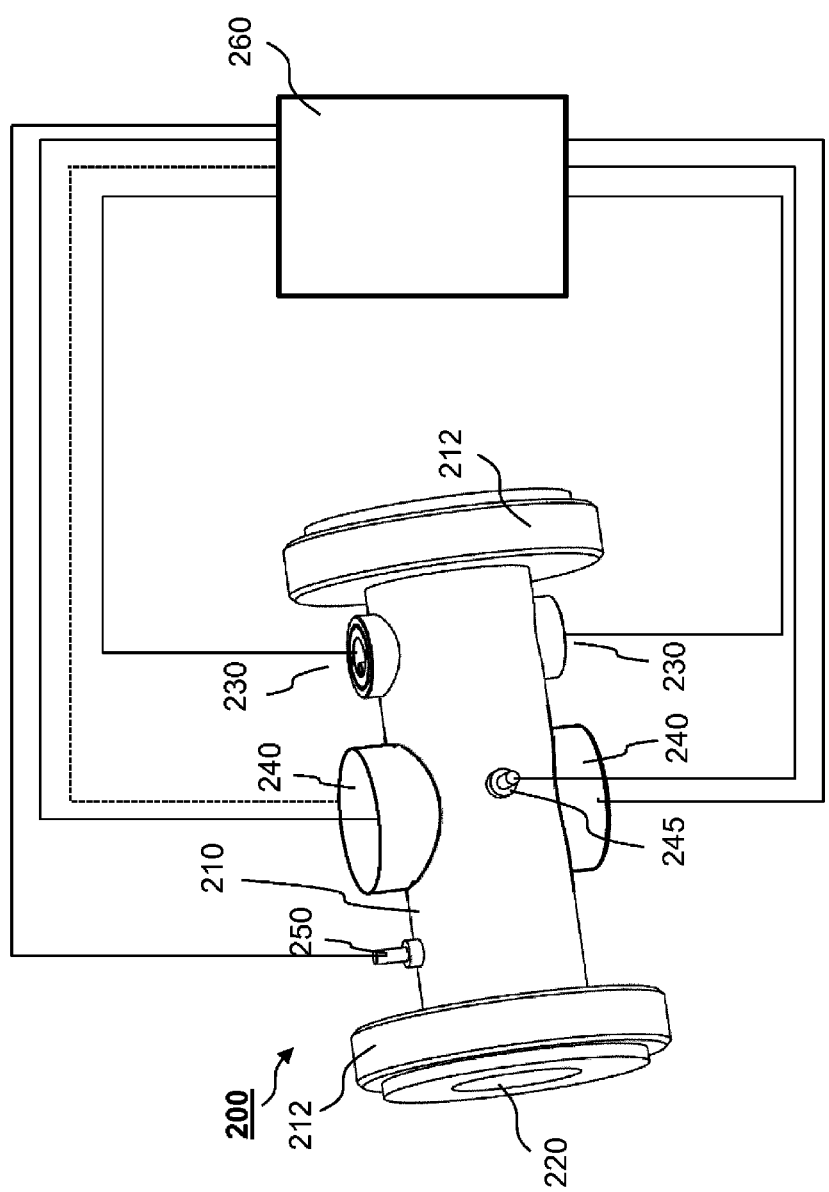

MEASURING ASSEMBLY FOR THE ANALYSIS OF A FLOWING MEDIUM BY MEANS OF MICROWAVES

CROSS-REFERENCE TO RELATED APPLICATIONS

The present application is related to and claims the priority benefit of German Patent Application No. 10 2016 125 809.1, filed on Dec. 18, 2016 and International Patent Application No. PCT/EP2017/080087 filed on Nov. 22, 2017, the entire contents of which are incorporated herein by reference.

TECHNICAL FIELD

The present invention relates to a measuring assembly for analyzing properties of a flowing medium by means of microwaves. In particular, the physical variables of permittivity and loss factor of a medium in a process line can be determined by means of microwaves. From these two variables, measured either at one or over many different frequencies, conclusions regarding application-specific parameters, e.g., regarding the proportion of water in a mixture of water and other non-polar or slightly polar components, can be drawn.

BACKGROUND

The established transmission/reflection measurement is described in L. F. Chen, C. K. Ong, C. P. Neo, V. V. Varadan, V. K. Varadan—"Microwave Electronics, Measurement and Materials Characterization," John Wiley & Sons Ltd., 2004. For this purpose, the microwave signal is coupled into the medium in a container or tube at two different positions, the scattering parameters (transmission and, optionally, reflection) between these coupling structures are measured, and said physical properties of the medium are calculated from the measured scattering parameters.

Conventional coupling structures, however, have various disadvantages:

Many coupling structures, such as a shortened dipole antenna, protrude into the measuring tube. However, this is undesirable with respect to a pressure loss and in media with solids content, due to the danger of blockage of the measuring tube or possible damage to the coupling structure.

Coupling structures, which are attached outside the metallic measuring tube and therefore do not protrude into the measuring tube, require a dielectric (non-conductive) window through which the microwave signal can be coupled. Both in respect of hygiene requirements for applications in the food sector and in view of the compressive strength, sealing this window against the metallic measuring tube is, however, structurally costly.

If a measurement of the flow rate by the magnetic-inductive measurement principle is also to take place simultaneously with the measurement of the material properties by a microwave sensor system, the medium-contacting steel tube surrounding the usual coupling structures is not compatible with the required insulation of the medium of the magnetic-inductive measurement principle against the conductive tube wall. A combination of both measurement principles in one measuring point or in one device is therefore out of the question.

SUMMARY

The aim of the invention is therefore to provide a measuring assembly that overcomes the above disadvantages.

The aim is achieved according to the invention by the measuring assembly according to independent claim 1.

The measuring assembly according to the invention comprises:
- a metallic measuring tube open on both sides for carrying a medium, wherein the measuring tube has an outer circumferential surface, an inner circumferential surface, and at least two apertures, wherein the two apertures extend from the outer circumferential surface to the inner circumferential surface;
- a dielectric cladding layer, which rests on the inner circumferential surface of the measuring tube;
- a first microwave antenna, which is arranged in the region of the first aperture and with which contact can be made through the first aperture;
- a second microwave antenna, which is arranged in the region of the second aperture and with which contact can be made through the second aperture;
- wherein the dielectric cladding layer forms a dielectric waveguide, via which microwaves can, at least to some extent, reach from the first microwave antenna to the second microwave antenna.

In a development of the invention, the measuring assembly further comprises a first conductive ring structure and a second conductive ring structure, which are respectively arranged on a face side of the metallic measuring tube and delimit the dielectric cladding layer on the face side.

These ring structures can, for example, be part of the measuring tube itself, or be mounted on the face side of the measuring tube, e.g., when installed in a pipeline, in the form of adjacent tubes or in the form of annular disks of matching inner diameter.

The coupling of the electromagnetic power into the dielectric cladding layer, which is also called a liner, can take place analogously to the coupling into a conventional waveguide. These possibilities include, in particular, coupling by a probe that is either conductively connected to the medium or terminates within the liner in a manner insulated from the medium. The aperture through the metallic outer tube can, expediently, take place in coaxial line technology. If the probe is conductively connected to the medium, it is possible to additionally use the probe in parallel as a measuring electrode for the flow measurement according to the magnetic-inductive principle. By means of their large frequency difference between microwave signals with frequencies above 1 GHz and the signals for flow measurement with frequencies of not more than 10 MHz, the different measurement signals can be separated. A so-called bias tee—a combination of high and low pass—can be used for this purpose.

In a development of the invention, the first microwave antenna is covered by the cladding layer, and/or the second microwave antenna is covered by the cladding layer.

In a development of the invention, the measuring tube is substantially cylindrical, wherein the cladding layer has a thickness b which is not more than one-tenth, in particular not more than one-twentieth, of the inner diameter of the measuring tube.

In a development of the invention, the cladding layer has an average thickness d of not less than 2 mm, in particular not less than 4 mm, and preferably not less than 5 mm.

In a development of the invention, the measuring tube has a measuring tube axis, wherein a straight connecting line exists between the first microwave antenna and the second microwave antenna, and intersects the measuring tube axis at a right angle.

In a development of the invention, the first microwave antenna comprises a planar antenna, and/or the second microwave antenna comprises a planar antenna.

The planar antenna can, in particular, be fed differentially via a coaxial connector.

In a development of the invention, the planar antenna(s) is/are spiral-shaped.

In a development of the invention, the planar antennas comprise a pressure-bearing ceramic plate.

In a development of the invention, the measuring assembly further comprises a magnet assembly for generating a magnetic field which penetrates the measuring tube substantially perpendicularly to the measuring tube axis.

In a development of the invention, the measuring assembly comprises a first electrode and a second electrode, which extend through the cladding layer into the measuring tube, wherein the electrodes are designed to electrically contact a medium carried in the measuring tube, wherein, in particular, a straight connecting line between the two electrodes extends substantially perpendicularly to the magnetic field and perpendicularly to the measuring tube axis.

In a development of the invention, the first microwave antenna has the first electrode, and the second microwave antenna has the second electrode.

In a development of the invention, the measuring assembly further comprises operation and evaluation electronics, which have a high-frequency generator for supplying at least one of the microwave antennas with at least one high-frequency signal and which are designed to determine, on the basis of the microwave signals received from the other antenna, at least one property of a medium carried in the measuring tube.

In a development of the invention, the high-frequency generator is designed to supply the at least one of the microwave antennas with a sequence of high-frequency signals of different frequencies.

In a development of the invention, the operation and evaluation electronics are designed to determine the at least one property of the medium carried in the measuring tube on the basis of the attenuation of the high-frequency signals and/or the phasing between the irradiated and received high-frequency signals.

In a development of the invention, the magnet assembly comprises at least one field coil, wherein the operation and evaluation electronics are designed to supply the at least one field coil, to detect a potential between the first electrode and the second electrode, which potential depends upon the flow rate of a medium through the measuring tube, and to determine a flow measurement value based upon the potential.

BRIEF DESCRIPTION OF THE DRAWING

The invention is described in the following in further detail on the basis of the exemplary embodiment shown in the figures. Shown are:

FIG. 1a a spatial representation of an exemplary embodiment of a measuring assembly according to the invention;

FIG. 1b a side view of the measuring assembly of FIG. 1a;

FIG. 1c a cross-section through the measuring assembly of FIG. 1b in the plane C-C;

FIG. 1d a cross-section through the measuring assembly of FIG. 1b in the plane D-D;

FIG. 1e a detailed view of the measuring assembly of FIG. 1d at the position identified by E;

FIG. 6 shows a further exemplary embodiment of a measuring assembly according to the invention.

DETAILED DESCRIPTION

Figure 2B:
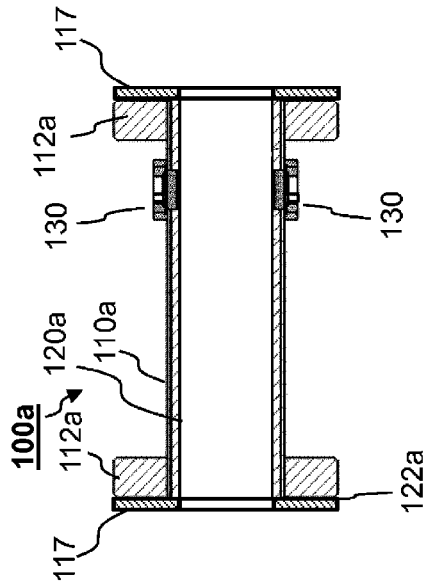
FIG. 2b a longitudinal section through another exemplary embodiment of a measuring assembly with face-side metal disks.

The measuring assembly shown in FIGS. 1a through 1e comprises a metallic measuring tube 110 with face-side, metallic connecting flanges 112, which measuring tube is lined with a liner 120 which comprises a plastic—for example, a polyurethane or a fluoropolymer, such as PFA or PTFE. The liner 120 may have face-side sealing surfaces 122 which lead out of the measuring tube 110 and rest against the face sides of the flanges 112.

In order to be able to couple or decouple microwaves, the measuring assembly 100 comprises two antenna units 130 which are arranged opposite one another on a circumferential surface of the measuring tube 110 and the details of which are shown, in particular, in FIG. 1e. In the region of the antenna units 130, the measuring tube 110 respectively has one aperture 114, which is surrounded at the outer circumferential surface of the measuring tube 100 by a threaded sleeve 116, into which a clamping ring 118 is screwed in order to clamp a ceramic plate 132, which forms a support body for a planar antenna, as well as a terminal board 134, which is arranged on the outside of the ceramic plate 132, against the liner 120. In order to compensate for temperature fluctuations and manufacturing tolerances, an elastic ring 136 may additionally be arranged between the clamping ring 118 and the ceramic plate 132 or the terminal board 134. From its outside, the liner 120 has, at the position of the ceramic plate 132, a recess 124, which is completely filled by the ceramic plate 132. As a result, a support body of a planar antenna is introduced into the liner 120, without affecting the integrity of the liner 120 toward the interior of the measuring tube. In addition, the compressive strength of the measuring assembly is maintained by suitable dimensioning of the ceramic plate 132 and the clamping ring 118.

For the measuring assembly according to the invention, it is advantageous if the liner 120 is delimited in the longitudinal direction of the measuring tube 110 by electrically-conductive material, in particular metal. In order to realize this condition, two alternatives are shown in FIGS. 2a through 2c.

Figure 2D:
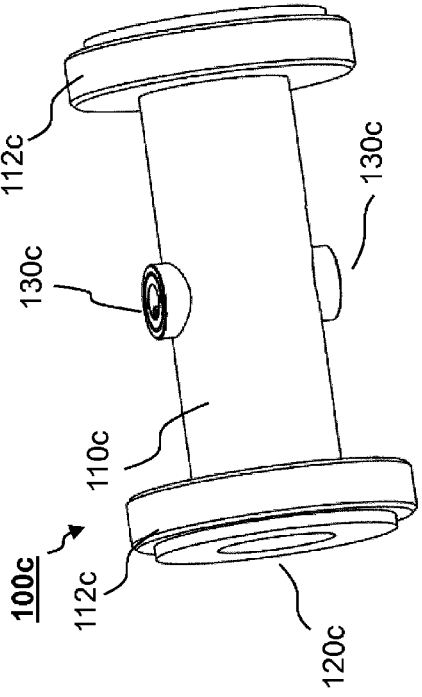
FIG. 2d a spatial representation of a second exemplary embodiment of a measuring assembly according to the invention.
Figure 2A:
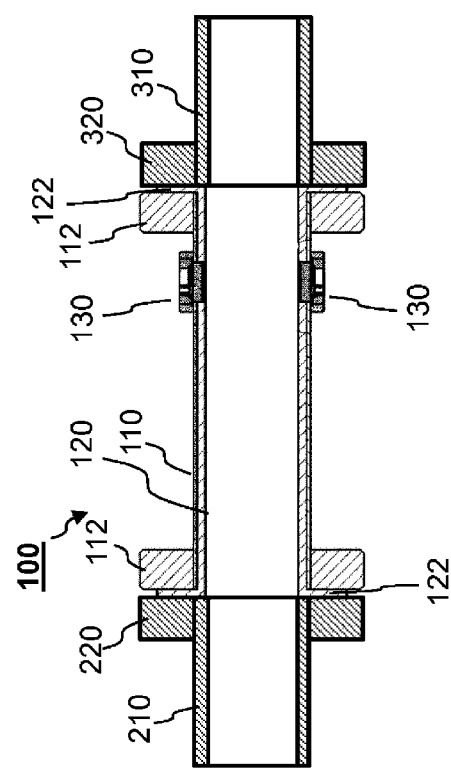
FIG. 2a a longitudinal section through a pipeline section in which the measuring assembly of FIGS. 1a through 1e is installed.

FIG. 2a shows a measuring assembly 100 according to the invention, the measuring tube 110 of which is installed in a pipeline section between a first metallic tube 210 and a second metallic tube 310, wherein a flange 220 of the tube 210 and a flange 320 of the tube 310 are in each case connected to flanges 112 of the measuring tube 110. The two metallic tubes 210, 310 each have an inner diameter corresponding to the inner diameter of the liner 120. Thus, a delimitation of the liner 120 by a metallic material in the longitudinal direction of the measuring assembly 100 is achieved.

FIG. 2b shows a measuring assembly 100a according to the invention, which achieves a delimitation of the liner 120a by a metallic material in the longitudinal direction of the measuring assembly 100a, independently of an installation situation in a pipeline section. To this end, the measuring assembly 100a has metallic annular disks 117, the inner diameter of which corresponds to that of the liner 120a and which are fastened to the end faces of the flanges 112a—for example, by joining by means of soldering or welding. As a result, the annular disks 117 together with the measuring tube 110a form a conductive termination of the liner 120a in the radial direction outwards and in both axial directions.

Figure 2C:
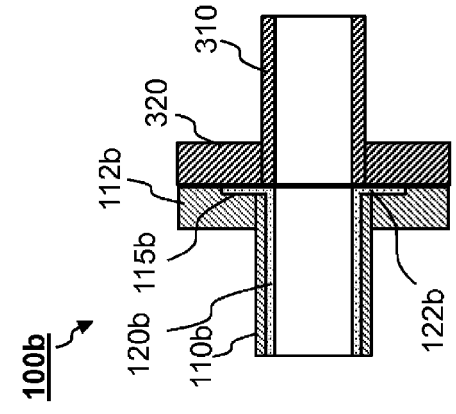
FIG. 2c a detailed longitudinal section through a measuring tube section of another exemplary embodiment of a measuring assembly.

The measuring assembly 100b shown in FIG. 2c has a modification in comparison to the measuring assembly of FIG. 1a. At its end face, the flange 112b has an annular, circumferential axial recess 115b in which the face-side sealing surface 122b of the liner 120 is received. To the extent that the flange 112b, in a radial section adjoining the axial recess 115b, is connected to a flange 320 of a metallic tube 310, no gap, which could impair the microwave signals, remains between them. Otherwise, the metallic tube 310 connected to the measuring assembly has an inner diameter corresponding to the inner diameter of the liner 120b. Thus, the delimitation of the liner 120b by a metallic material in the longitudinal direction of the measuring assembly 100b is achieved. FIG. 2c shows only one axial end section of the measuring assembly. Naturally, the other end section is designed accordingly. For the purposes of simplification, the representation of the antenna units was omitted in this drawing, even though the measuring assembly 100b according to the invention, of course, has two antenna units.

FIG. 2d shows a further embodiment of a measuring assembly 100c according to the invention, which differs from the exemplary embodiment of FIGS. 1a through 1e by the axial position of the antenna units 130c. While the asymmetric positioning of the antenna units shown in FIGS. 1a through 1e leaves room in the axial direction for other components on the measuring tube 110, the antenna units 130c in the exemplary embodiment of FIG. 2d are positioned symmetrically in the axial direction between the two flanges 112c of the measuring assembly. Otherwise, this embodiment of the measuring assembly 100c according to the invention corresponds to the embodiment of FIGS. 1a through 1e.

The coupling of the electromagnetic power into the liner can take place analogously to the coupling into a conventional waveguide. These possibilities include, in particular, coupling by a probe that is either conductively connected to the medium or terminates within the liner in a manner insulated from the medium. The aperture through the metallic outer tube can, expediently, take place in coaxial line technology. If the probe is conductively connected to the medium, it is possible to additionally use the probe in parallel as a measuring electrode for the flow measurement according to the magnetic-inductive principle. By means of their large frequency difference (microwave signals mostly >1 GHz, signal for flow measurement mostly <10 MHz), the different measurement signals can be separated. A so-called bias tee (combination of high and low pass) can be used for this purpose.

It is furthermore also conceivable to use a differentially-fed antenna, in particular a differentially-fed spiral antenna, to couple the electromagnetic power.

Figure 3B:
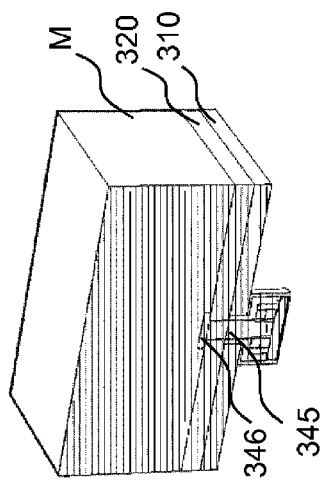
FIG. 3b a detailed longitudinal section through a waveguide antenna with MIF electrode a measuring tube of a measuring assembly according to the invention.
Figure 3C:
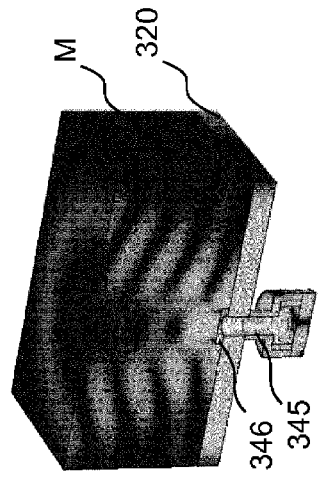
FIG. 3c a field simulation for the waveguide antenna with MIF electrode of FIG. 3b.
Figure 3A:
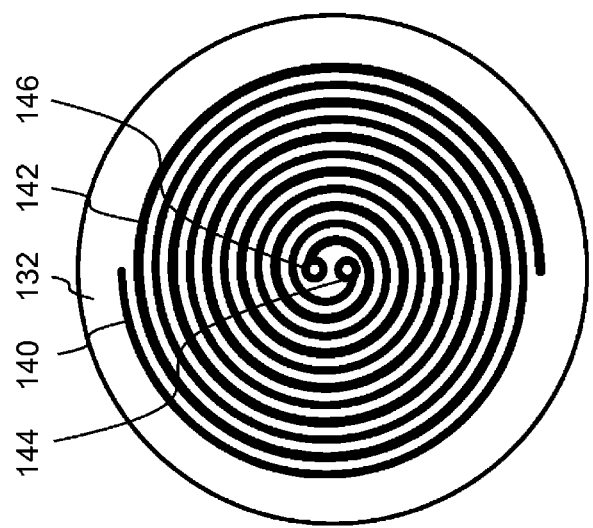
FIG. 3a a front view of a planar antenna of an exemplary embodiment of a measuring assembly according to the invention.

FIG. 3a shows a planar antenna with two spiral, metallic conductor tracks 140, 142 which are prepared on the face side of the ceramic plate 132. During measurement operation, the ceramic places 132 are inserted with the conductor tracks 140, 142 first into the measuring tube, so that the conductor tracks 140, 142 are positioned in the recess 124 of the liner 120. The conductor tracks 142, 144 are contacted in the center of the ceramic plate 132 via electrical feedthroughs 144, 146 from the rear side of the ceramic plate 132. They are connected via the feedthroughs to the terminal board 134 shown, for example, in FIG. 1e in order to supply the planar antenna with a microwave signal or to conduct away a microwave signal received from the planar antenna.

FIG. 3b shows a waveguide antenna 345, which is guided through a metallic measuring tube 310 and a liner 320 to the medium M and is terminated towards the medium M with a metallic MIF electrode 146, which is in galvanic contact with the medium in order to detect flow-dependent potentials in the realization of the measuring assembly as magnetic-inductive flow measuring device.

The results shown in FIG. 3c of a simulation show the propagation of the microwave signals in the liner 320 and in the medium M.

Figure 4A:
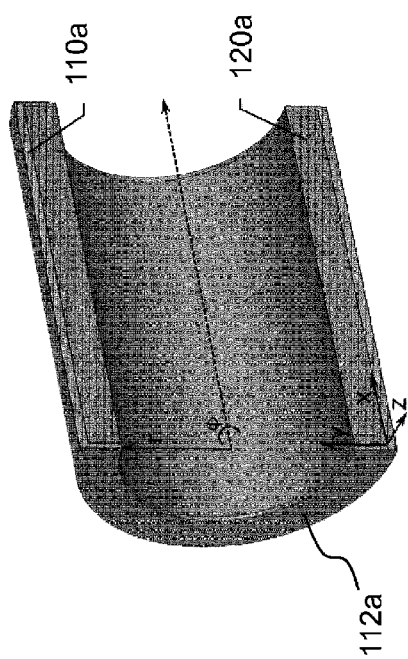
FIG. 4 a schematic half-section through a measuring tube of a measuring assembly according to the invention.
Figure 4B:
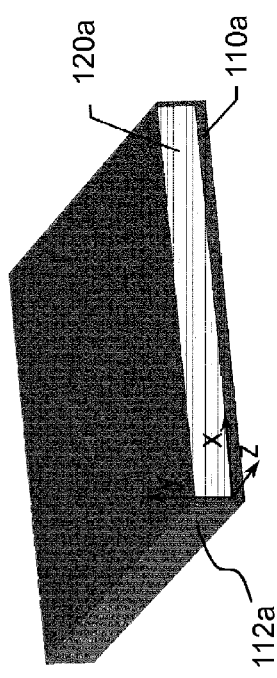

The operating principle of the measuring assembly 100 according to the invention will now be explained with reference to FIGS. 4a and 4b. The electrically insulating liner 120a (which is, for example, present in a magnetic-inductive flowmeter) can be used as a functional part of a coupling structure for a microwave signal. The construction is designed in such a way that the liner 120a adjoins a metallic wall, viz., the measuring tube 110a surrounding the liner 120a and the face-side annular disks 112a, on all sides, except for the medium-contacting inner surfaces. The sectional view according to FIG. 4a shows this schematically. "Rolling" along the pipe circumference can show that the liner 120a corresponds, to a good approximation, to a waveguide, as sketched in FIG. 4b. In comparison to an ideal rectangular waveguide which is delimited on all sides by an ideally conductive electrical wall, the conductivity of the upper, medium-contacting waveguide wall is finite and dependent upon the medium in the measuring tube.

In the case of very highly conductive media, the wave propagation in this structure can be approximated by the wave propagation in an ideal rectangular waveguide filled with the dielectric material of the liner. Several solutions ($TE_{mn}$ and $TM_{mn}$ modes) which fulfill these boundary conditions can then be determined from the Maxwell equations. These field modes have a cutoff frequency $f_{c,mn}$ which is given as $$f_{c,mn} = \frac{1}{2\pi\sqrt{\varepsilon\mu}} \sqrt{\left(\frac{m\pi}{a}\right)^2 + \left(\frac{n\pi}{b}\right)^2} \tag{1}$$

above which they are capable of propagation. In this case, "a" denotes the length of the waveguide in the direction of the x-coordinate axis designated in FIG. 2, and "b" the length along the y-coordinate axis. The integer indices m and n indicate the order of the respective mode. The propagation coefficient of the respective mode can likewise be derived from the Maxwell equations as $$\gamma_{mn(f)} = j \frac{2\pi f \sqrt{\epsilon_r \mu_r}}{c_0} \sqrt{1 - \left(\frac{f_c}{f}\right)^2} \quad (2)$$

In the case of media with lower conductivity, an accurate calculation of the modes capable of propagation and the associated propagation coefficients can take place by adjusting the boundary condition of the medium-contacting side of the waveguide and simulation of the structure by software for full-wave simulation. An additional loss portion occurs during wave propagation due to boundary conditions that are not ideally conductive.

Furthermore, due to the ring-shaped arrangement of the waveguide along the tube circumference, there is the additional boundary condition that the field image in the front and rear end faces of the model according to FIG. 2 must be identical in the x-y plane (z=min and z=max). This additional boundary condition can only be met if the length "l" of the waveguide corresponds to an integer multiple of the wavelength in the waveguide. In the lossless case, this condition is then:

$$\lambda = j \frac{2\pi}{\gamma_{mn(f)}} \stackrel{!}{=} p \cdot l \quad (3)$$

This condition can only be met for certain frequencies f; the associated resonant frequencies can thereby be calculated. In the lossy case, this calculation preferably takes place with numerical aids. Due to the occurring losses, the resonant frequency occurring in the ideally lossless case is broadened to a resonance curve; wave propagation is possible within its resonance width. Several of these resonances can transition into one another and thus enable wave propagation within a wide frequency range.

Figure 5A:
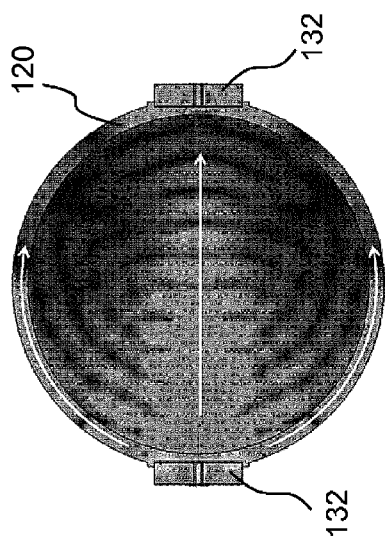
FIG. 5a exemplary simulation results for the field distribution wave propagation in a measuring assembly according to the invention.

Each of these modes, which propagate predominantly in the liner, leads to an associated current density distribution in the conductive boundary surfaces. However, such a current density distribution in the medium-contacting boundary layer of the liner also causes the propagation of an electromagnetic field into the non-ideally conductive medium. The boundary layer thus fulfills the function of an antenna. The faster propagation speed in the liner in comparison to typical aqueous media leads to a directed emission of electromagnetic power through the medium, as illustrated in FIG. 5a. The gray levels here correspond to the electric field strength.

Figure 5B:
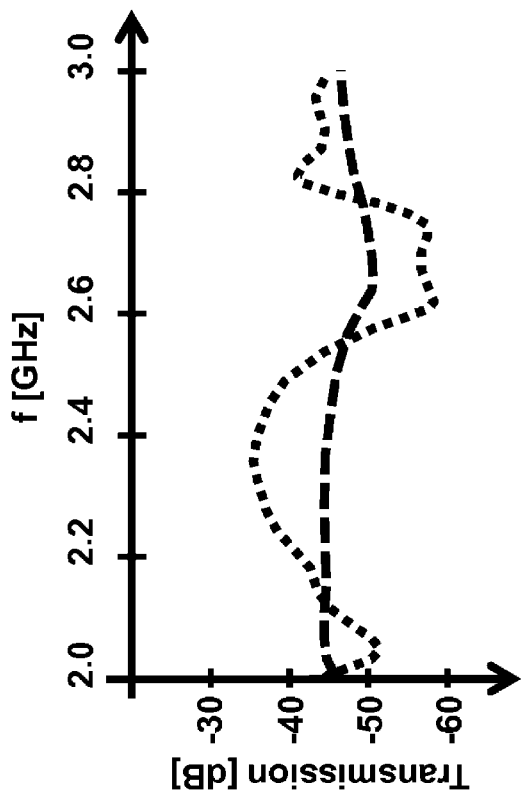
FIG. 5b a diagram regarding the transmission of microwaves in a measuring assembly according to the invention and in a measuring assembly according to the prior art.

By superimposing a propagation path in the liner with a propagation path through the medium, more meaningful transmission curves are achieved, in particular for media with low electrical conductivity, as illustrated by FIG. 5b. The dotted curve shows the transmission curve for microwaves in a measuring assembly according to the invention, which is filled with a medium having a conductivity of 1.5 S/m. The dashed curve shows the transmission curve for microwaves in a measuring assembly without a liner, which measuring assembly is filled with a medium having the same medium. The transmission curve obtained with the measuring assembly according to the invention is significantly more contoured, and thus enables a more reliable determination of media properties.

FIG. 6 shows, lastly, a further exemplary embodiment of a measuring assembly 200 according to the invention, which substantially develops the measuring assembly of FIGS. 1a through 1e. In addition to two antenna units 230 for the microwave signals, two field coil assemblies 240 for magnetic-inductive flow measurement (MIF) are arranged in the same orientation on a measuring tube 210. In the axial position of the field coil assemblies 240, two, mutually opposite electrodes 245 are arranged perpendicularly to the direction of a magnetic field acting between field coil assemblies 240 and perpendicularly to the axial direction of the measuring tube, and extend through the measuring tube 210 and a liner 220 into the interior of the measuring tube in order to detect a flow-dependent potential of a flowing medium. (In the drawing, only one electrode is shown.) In addition, the measuring assembly comprises a temperature sensor 250 for detecting a temperature of the medium. The measuring assembly 200 further comprises an operation and evaluation unit 260, to which the antenna units 230, the field coil assemblies 240, the electrodes 245, and the temperature sensor 250 are connected. The operation and evaluation unit can have various subunits which separately process different measuring tasks of the measuring assembly 200.

Instead of the separate antenna units 230, waveguide antennas with an integrated MIF electrode may, in a modification, also be used at the position of the electrodes 245.

The invention claimed is:

1. A measuring assembly, comprising:
    a metallic measuring tube open on both sides for carrying a medium, wherein the measuring tube has an outer circumferential surface, an inner circumferential surface, and at least two apertures, wherein the two apertures extend from the outer circumferential surface to the inner circumferential surface;
    a dielectric cladding layer that rests on the inner circumferential surface of the measuring tube;
    a first microwave antenna which is arranged in the measuring tube and with which contact can be made through the first aperture;
    a second microwave antenna, which is arranged in the measuring tube and with which contact can be made through the second aperture;
    a magnet assembly for generating a magnetic field which penetrates the measuring tube perpendicularly to the measuring tube axis; and
    a first electrode and a second electrode, wherein the first electrode and the second electrode extend through the cladding layer into the measuring tube, wherein the first electrode and the second electrode are designed to electrically contact a medium carried in the measuring tube,
    wherein the dielectric cladding layer forms a dielectric waveguide via which microwaves can reach from the first microwave antenna to the second microwave antenna,
    wherein a straight connecting line between the two electrodes extends perpendicularly to the magnetic field and perpendicularly to the measuring tube axis, and
    wherein the first microwave antenna has the first electrode, and the second microwave antenna has the second electrode.

2. The measuring assembly according to claim 1, further comprising:

a first conductive ring structure and a second conductive ring structure which are respectively arranged on a face side of the metallic measuring tube and delimit the dielectric cladding layer on the face side.

3. The measuring assembly according to claim 1, wherein the first microwave antenna is covered by the cladding layer, and/or wherein the second microwave antenna is covered by the cladding layer.

4. The measuring assembly according to claim 1, wherein the measuring tube is substantially cylindrical, wherein the cladding layer has a thickness of not more than 10 mm, and/or is one-fifth of the inner diameter of the measuring tube.

5. The measuring assembly according to claim 1, wherein the cladding layer has a thickness which is not less than 2 mm.

6. The measuring assembly according to claim 1, wherein the measuring tube has a measuring tube axis, wherein a straight connecting line exists between the first microwave antenna and the second microwave antenna and intersects the measuring tube axis at a right angle.

7. The measuring assembly according to claim 1, wherein at least one of the microwave antennas includes a planar antenna.

8. The measuring assembly according to claim 7, wherein at least one of the planar antennas is spiral-shaped.

9. The measuring assembly according to claim 7, wherein at least one of the planar antennas has a pressure-bearing ceramic plate as a support body.

10. The measuring assembly according to claim 1, further comprising:

an operation and evaluation electronics including a high-frequency generator for supplying at least one of the microwave antennas with at least one high-frequency signal, wherein the operation and evaluation electronics are designed to determine, on the basis of the microwave signals received from the other antenna, at least one property of a medium carried in the measuring tube.

11. The measuring assembly according to claim 10, wherein the high-frequency generator is designed to supply the at least one of the microwave antennas with a sequence of high-frequency signals of different frequencies.

12. The measuring assembly according to claim 10, wherein the operation and evaluation electronics are designed to determine the at least one property of the medium carried in the measuring tube on the basis of an attenuation of the high-frequency signals and/or the phasing between the irradiated and received high-frequency signals.

13. The measuring assembly according to claim 10, wherein the magnet assembly comprises at least one field coil, wherein the operation and evaluation electronics are designed to supply the at least one field coil, to detect a potential between the first electrode and the second electrode, which potential depends upon the flow rate of a medium through the measuring tube, and to determine a flow measurement value based upon the potential.

* * * * *